No. 740,937. PATENTED OCT. 6, 1903.
N. H. SMITH.
CHISEL.
APPLICATION FILED APR. 20, 1903.
NO MODEL.
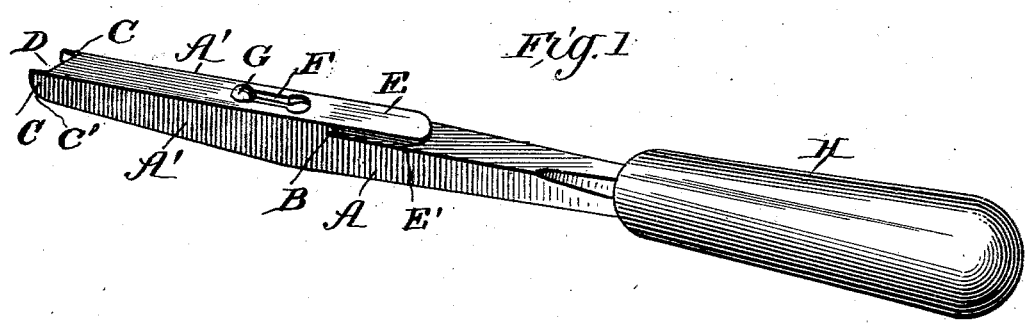
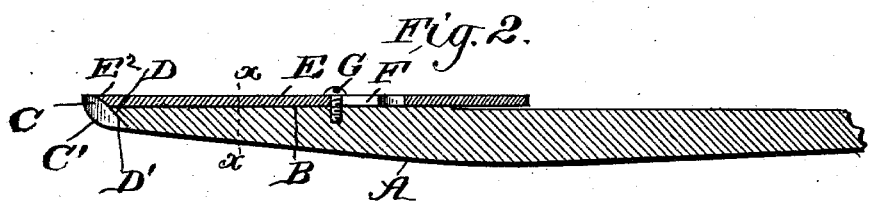
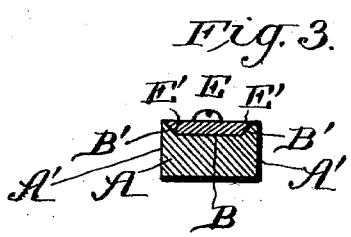
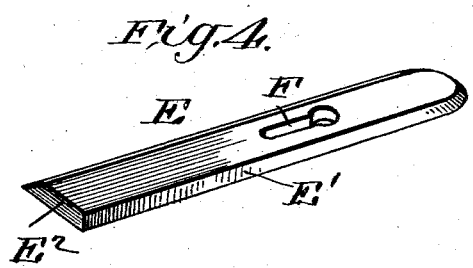
WITNESSES:
Jos. A. Ryan
Harrison B. Brown
INVENTOR
Newton H. Smith
BY Munn & Co.
ATTORNEYS.

No. 740,937.

Patented October 6, 1903.

UNITED STATES PATENT OFFICE.

NEWTON HORACE SMITH, OF BONAPARTE, IOWA.

CHISEL.

SPECIFICATION forming part of Letters Patent No. 740,937, dated October 6, 1903.

Application filed April 20, 1903. Serial No. 153,444. (No model.)

*To all whom it may concern:*

Be it known that I, NEWTON HORACE SMITH, a citizen of the United States, and a resident of Bonaparte, in the county of Van Buren and State of Iowa, have made certain new and useful Improvements in Chisels, of which the following is a specification.

My invention relates to chisels specially adapted for use in wood-turning.

The object had in view is to provide a chisel of the character stated with cutting edges so constructed that the fiber of the material being turned will be cut off in a smooth manner, not broken, and then rapidly removed. With my chisel rapid, accurate, and smooth work in squaring up ends, removing superfluous material, plowing grooves, either vertical or oblique, in making pulleys, rosettes, or disks is facilitated. It is useful and rapid in all face-plate work and in getting work ready for other tools.

The invention consists of the special construction and combinations of parts, which I will now proceed to describe and point out the novel features in the subjoined claims.

Reference is had to the accompanying drawings, forming a part of this specification, in which—

Figure 1 is a perspective view illustrating my invention. Fig. 2 is a detail longitudinal section. Fig. 3 is a transverse section on line $x\ x$, Fig. 2. Fig. 4 is a detail perspective view showing the bit detached, and Fig. 5 is an inverted plan detail view illustrating the cutting end of my invention.

In carrying out my invention I employ a stock A, having in its upper face a groove B with bevel sides B'. The stock A has parallel sides A', ending at its forward end with projecting spurs C, having rounding cutting edges C', as shown. The cut-away forward end portion D of the stock A is fashioned into a cutting edge D'.

E indicates an adjustable bit having under-beveled side edges E'. It will be noticed that my bit E corresponds in cross-section with and fits snugly into the groove B and when in place that its upper side is substantially level with the top or upper cutting portion of the spur-cutters C. The forward end of the bit E is under-beveled, forming a cutting edge $E^2$.

Special advantage results in fitting the bit as I have just described, as clogging by chips or spongy material being turned is thereby prevented from getting under it.

Means for securing the bit in place on the stock may be variously modified without departing from the spirit of my invention. One form whereby adjustment is afforded consists in providing it with an elongated slot F, adapted to receive a screw G, tapped into the stock A. Any suitable handle H may be employed and the same be formed integral with the stock A or of wood, as may be desired.

Having thus described my invention, what I claim as new, and desire to secure by Letters Patent, is—

1. A wood-turning chisel consisting of a stock grooved on its upper side, spurs at the forward end of the stock having rounding cutting edges, a chisel edge between the said spurs, an adjustable bit having a chisel edge at its forward end, and means whereby the bit is held as adjusted substantially as described.

2. A wood-turning chisel consisting of a stock having a groove on its upper side with bevel side edges as specified, an adjustable bit conforming with a cross-section of the said groove, spurs with forward rounding edge and a rear chisel-edge at the forward end of the stock, and means whereby the bit is secured as adjusted substantially as described.

NEWTON HORACE SMITH.

Witnesses:
MARY W. JOHNSON,
WM. J. JOHNSON.